United States Patent [19]
Carletti

[11] Patent Number: 5,437,412
[45] Date of Patent: Aug. 1, 1995

[54] VARIABLE GEOMETRY JET ENGINE EXHAUST NOZZLE

[75] Inventor: Ollivier Carletti, Vaux le Penil, France

[73] Assignee: Societe Nationale d'Etude et de Construction de Moteurs d'Aviation (S.N.E.C.M.A.), Paris, France

[21] Appl. No.: 264,338

[22] Filed: Jun. 23, 1994

[30] Foreign Application Priority Data

Jun. 23, 1993 [FR] France ................................ 93 07606

[51] Int. Cl.⁶ .............................................. F02K 1/12
[52] U.S. Cl. ........................... 239/265.25; 239/265.35; 239/265.39; 60/262; 60/271
[58] Field of Search ......... 239/265.19, 265.25–265.43; 244/52; 60/262, 271

[56] References Cited

U.S. PATENT DOCUMENTS

| | | |
|---|---|---|
| 2,593,420 | 4/1952 | Diehl . |
| 3,133,412 | 5/1964 | Westley ........................ 239/265.39 |
| 3,174,582 | 3/1965 | Duthion et al. ................. 239/265.39 |
| 3,442,455 | 5/1969 | Smale . |
| 3,564,934 | 2/1971 | McMurtry ....................... 239/265.39 |
| 3,615,052 | 10/1971 | Tumavicus ....................... 239/265.39 |
| 3,976,160 | 8/1976 | Hoch et al. ..................... 239/265.39 |
| 4,441,313 | 4/1984 | Joubert et al. ........................ 60/262 |
| 4,878,617 | 11/1989 | Novotny ......................... 239/265.35 |
| 4,978,071 | 12/1990 | MacLean et al. ............... 239/265.19 |
| 5,016,818 | 5/1991 | Nash et al. ..................... 239/265.19 |

FOREIGN PATENT DOCUMENTS

| | | |
|---|---|---|
| 1225736 | 7/1960 | France . |
| 1380382 | 10/1964 | France . |
| 2068798 | 9/1971 | France . |
| 2602274 | 2/1988 | France .......................... 239/265.39 |

Primary Examiner—Karen B. Merritt
Attorney, Agent, or Firm—Bacon & Thomas

[57] ABSTRACT

A variable cross-section nozzle for a jet engine is disclosed having main inner (hot) flaps defining an inner nozzle and main outer (cold) flaps defining an outer nozzle with adjacent main flaps interconnected by secondary flaps, such that actuators connected to two of the main flaps can vary the cross-sectional configuration of the exhaust nozzle outlet between a substantially circular configuration to one which is subsequentally or completely closed. The actuator is mechanically connected to the main inner and main outer flaps such that the nozzle configuration may be varied using a minimum number of actuators. A single outer nozzle may surround a pair of inner nozzles such as utilized on a dual jet engine aircraft. A single actuator may be connected to the main inner flaps of both inner exhaust nozzles and with a linkage interconnecting the main inner flaps with adjacent main outer flaps in order to enable a single actuator to operate all of the flaps so as to change the configurations of both the inner nozzles and the outer nozzle.

21 Claims, 5 Drawing Sheets

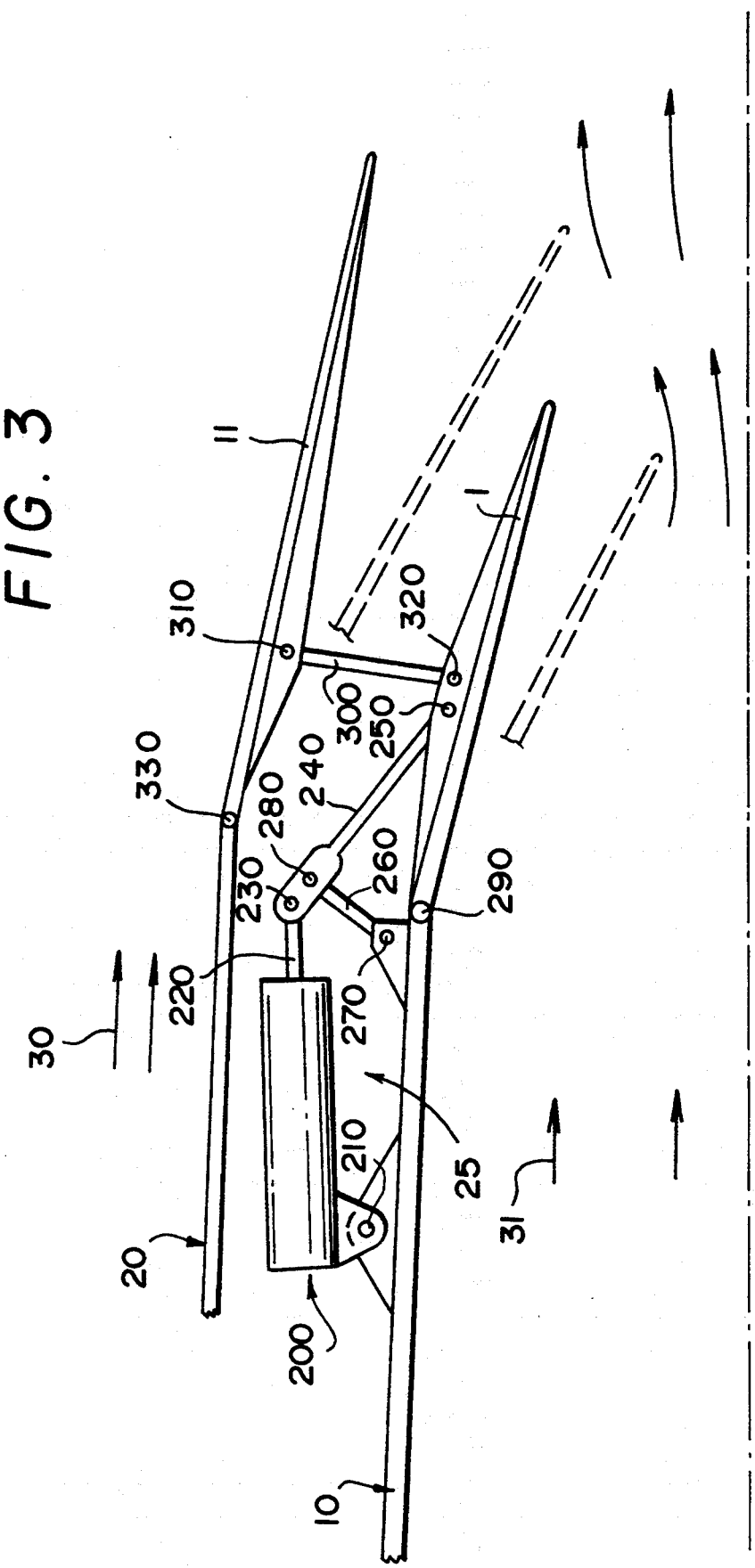

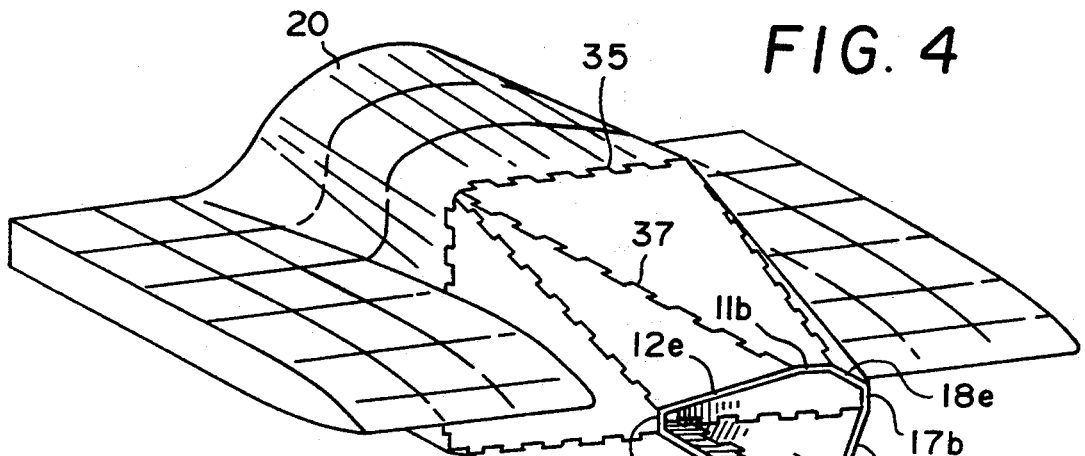
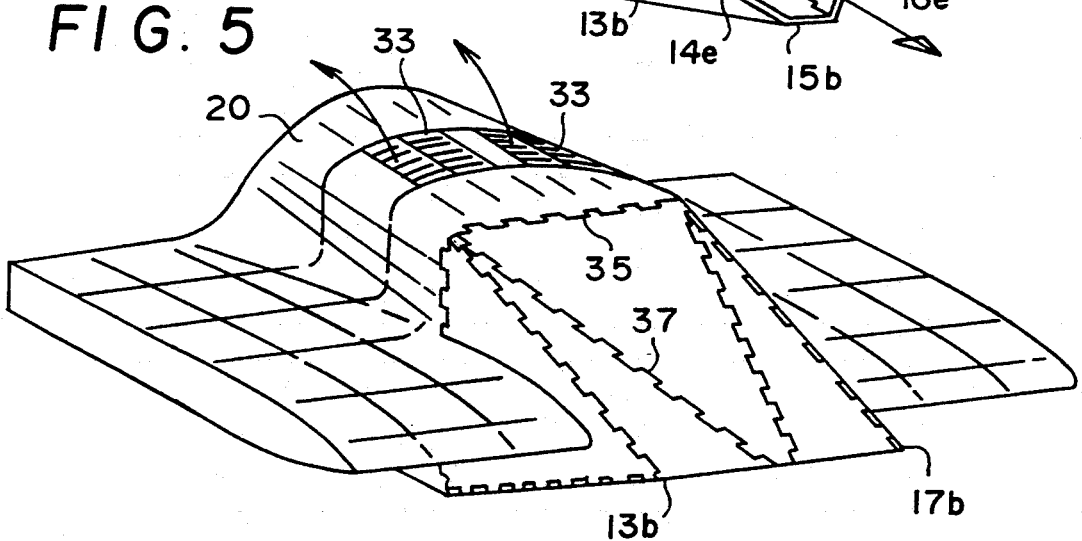
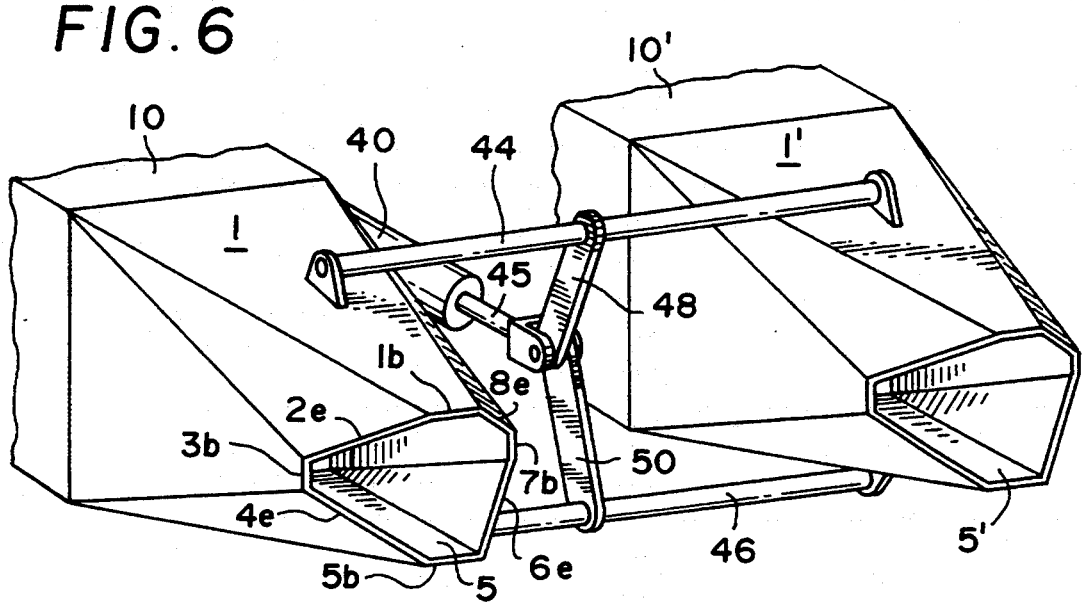

VARIABLE GEOMETRY JET ENGINE EXHAUST NOZZLE

BACKGROUND OF THE INVENTION

The present invention pertains to a jet engine exhaust nozzle, more particularly such a nozzle having an outlet with variable cross-sectional geometry and thrust vectoring features.

The maneuverability of high performance jet aircraft can be improved by the configuration of the exhaust nozzle of the jet engine. The modification of the cross-sectional configuration of the nozzle varies the speed of the exhaust gases to improve the adaptation of the engine to aircraft flight conditions.

It is also known to vary the orientation of the exhaust nozzle to deflect the gas jet in order to improve the maneuverability of the aircraft. Also, certain nozzles allow the reduction in height of the jet of exhaust gases passing through the nozzle so as to reduce the lateral emission of infrared rays in order to make the aircraft more difficult to detect.

The known nozzles include a plurality of articulated flaps, known as hot flaps which are in contact with the hot gas jet emanating from the aircraft engine so as to modify its cross-sectional area and configuration. Nozzles may also include a second plurality of articulated flaps, known as cold flaps, which generally form an extension of the aircraft fuselage enclosing the exhaust duct of the jet engine. In order to achieve the maximum benefits of adjustable nozzles, the movements of the hot flaps and cold flaps must be synchronized.

Some aircraft include a thrust reversing device in which the direction of the gas flow from the jet engine is altered so as to provide a reverse thrust to the aircraft. Such devices typically employ flaps or other means for blocking the pathway of the normal flow of the exhaust gases towards the rear of the aircraft so as to redirect it in a direction having a thrust component in the reverse direction.

Traditionally, exhaust nozzles have had a generally circular cross-sectional configuration in which a number, typically twelve, of primary hot flaps in direct contact with the exhaust gases from the jet engine and an equal number of cold flaps in contact with the air which flows along the fuselage of the aircraft, are controlled by actuators. The movements of the cold flaps and the hot flaps are synchronized, generally by means of interconnecting rods. Also, some nozzles utilize secondary flaps which extend between, and whose movement is controlled by, the primary hot or cold flaps. Nozzles having such configurations, in spite of their good efficiency due to the generally circular cross-sectional configuration, are particularly complex both in the structure with the overlapping of the primary and secondary flaps, and because of its controls which typically require multiple actuators.

French Patent 2 651 020 discloses a simplified exhaust nozzle having a rectangular transverse cross-section defined by four surfaces on two movable flaps and two stationary lateral flaps. The movable flaps may be oriented symmetrically during the cruising mode of operation of the aircraft and can be closed to perform a thrust reversing function. The structure of the exhaust nozzle offers limited opportunities of pivoting, especially due to the necessity of a ball and socket structure to pivotally attach the flaps to the aircraft structure. In addition, the stationary lateral flaps, or walls, generate aerodynamic disturbances both on the aircraft and in the exhaust gas flow due to leakages existing between the movable flaps and the stationary flaps. The stationary flaps also incur significant stresses due to the aerodynamic pressure exerted on them and on their supporting structure. The forces of the ejected gases also induce significant bending stresses on the movable flaps due to the location of the support bearing structure and the connection point at which the actuator is attached to the movable flap.

U.S. Pat. No. 4,878,617 discloses a converging-diverging exhaust nozzle with a variable cross-sectional area which includes thirty-six flaps, rectangular or triangular in shape, articulated between one another by piano-type hinges. Such a nozzle structure is heavy and complex, the converging section of the exhaust nozzle alone comprising fourteen flaps and four actuators. The nozzle has sections which extend into the gas stream and which introduce aerodynamic disturbances which are harmful to the efficient flow of gases through the nozzle.

In both of the aforementioned examples, the pressure exerted by the exhaust gases on the flaps is fully transmitted to the supporting structure by the control actuators, thereby requiring the supporting structure to be fabricated from material having sufficient dimensions to allow it to resist such forces.

SUMMARY OF THE INVENTION

A variable cross-section nozzle for a jet engine is disclosed having main inner (hot) flaps defining an inner nozzle and main outer (cold) flaps defining an outer nozzle with adjacent main flaps interconnected by secondary flaps, such that actuators connected to two of the main flaps can vary the cross-sectional configuration of the exhaust nozzle outlet between a substantially circular configuration to one which is subsequentially or completely closed. The actuator is mechanically connected to the main inner and main outer flaps such that the nozzle configuration may be varied using a minimum number of actuators.

A single outer nozzle may surround a pair of inner nozzles such as utilized on a dual jet engine aircraft. A single actuator may be connected to the main inner flaps of both inner exhaust nozzles and with a linkage interconnecting the main inner flaps with adjacent main outer flaps in order to enable a single actuator to operate all of the flaps so as to change the configurations of both the inner nozzles and the outer nozzle.

The nozzle according to the invention may also provide a thrust vectoring function by forming the secondary flaps with a hinge such that each secondary flap has two portions. In this configuration, additional actuators are used to position the lateral main flaps so as to vector the thrust of the gases passing through the nozzle in any desired direction. In a dual-engine configuration, the lateral main flaps of the outer nozzle are each connected to one lateral inner flap of one of the two inner nozzles.

The invention alleviates the disadvantages of the prior art nozzles and allows implementation of a simplified exhaust nozzle structure having both a variable cross-section and thrust vectoring capabilities. The nozzle structure offers good sealing between the various flaps and reduces the level of stresses acting on these flaps thereby reducing the structural constraints imposed upon the previous nozzles. The invention also limits the mechanical elements necessary for controlling the configuration of the nozzle without diminishing the overall viability of the nozzle.

The nozzle has control means to operate the main flaps of both the inner and outer nozzles in synchronism with respect to a reference position. The flaps of the nozzle, when in the reference position, form a symmetrical convex polygon about the longitudinal axis of the exhaust gas duct with each flap forming an internal angle of between 90° and 180° with the adjacent flaps. The displacements of two opposite main flaps are identical and, if the opposite main flaps are moved towards each other, the two other opposite main flaps are displaced away from each other. In such cases, the exhaust gas stream will assume a smaller and flatter cross-section thereby emanating less lateral infrared radiation.

The articulated connections of the various flaps to one another considerably reduce the forces required to control the flaps and, as a consequence, it diminishes the total mass of the nozzle. The instant nozzle is particularly well adapted to be used in a dual-engine configuration with the hot flaps of each of the two engine nozzles defining a discharge gas flow and being enclosed by a single, outer nozzle having four main outer flaps. Such a dual engine nozzle structure is much simplified compared to the known prior art. The manipulation of the shapes of both inner nozzles, as well as the outer nozzle can be achieved by means of a single actuator which ensures simultaneous and synchronized movement of all of the flaps.

BRIEF DESCRIPTION OF THE FIGURES

FIG. 3 is a partial, cross-sectional view of the nozzle illustrated in FIG. 2.

FIG. 4 is a perspective view of the nozzle shown in FIGS. 1-3 in a first operational configuration.

FIG. 5 is a perspective view of the nozzle in FIG. 4 showing the nozzle in a second operational configuration.

FIG. 6 is a partial, perspective view of the inner nozzles in a dual-engine jet aircraft.

DETAILED DESCRIPTION OF THE PREFERRED EMBODIMENTS

Figure 1:
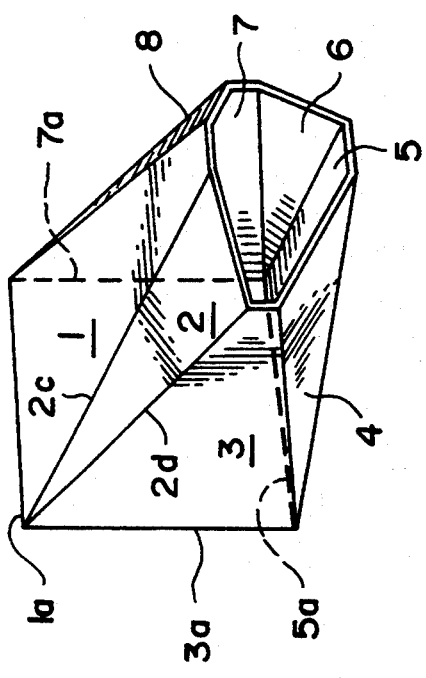
FIG. 1 is a perspective view of a first embodiment of an inner nozzle according to the present invention.

FIG. 1 schematically illustrates a first embodiment of an inner exhaust nozzle having four main inner flaps interconnected by four secondary inner flaps. The figure is schematic in nature and the control means for controlling the various flaps has been omitted for clarity. The main flaps include an upper generally horizontal flap 1, a generally vertical left side inner flap 3, a lower generally horizontal main flap 5 and a generally vertical right side main flap 7. Each of these main flaps has a generally trapezoidal shape with a large base, 1a, 3a, 5a and 7a, respectively, arranged in a generally rectangular configuration and attached to the jet exhaust duct (not shown).

Between adjacent main flaps, there is inserted secondary inner flaps each having a generally triangular configuration with a vertex of the triangle located at the junction of adjacent large bases of the adjacent main flaps. Thus, as can be seen, a left upper secondary flap 2 is pivotally connected to adjacent main inner flaps 1 and 3 such that sides 2c and 2d are pivotally attached to the adjacent main flaps by hinges. Similarly, lower left, lower right and upper right secondary inner flaps 4, 6 and 8 are pivotally connected between adjacent main inner flaps 3 and 5, 5 and 7, and 7 and 1, respectively.

Figure 2:
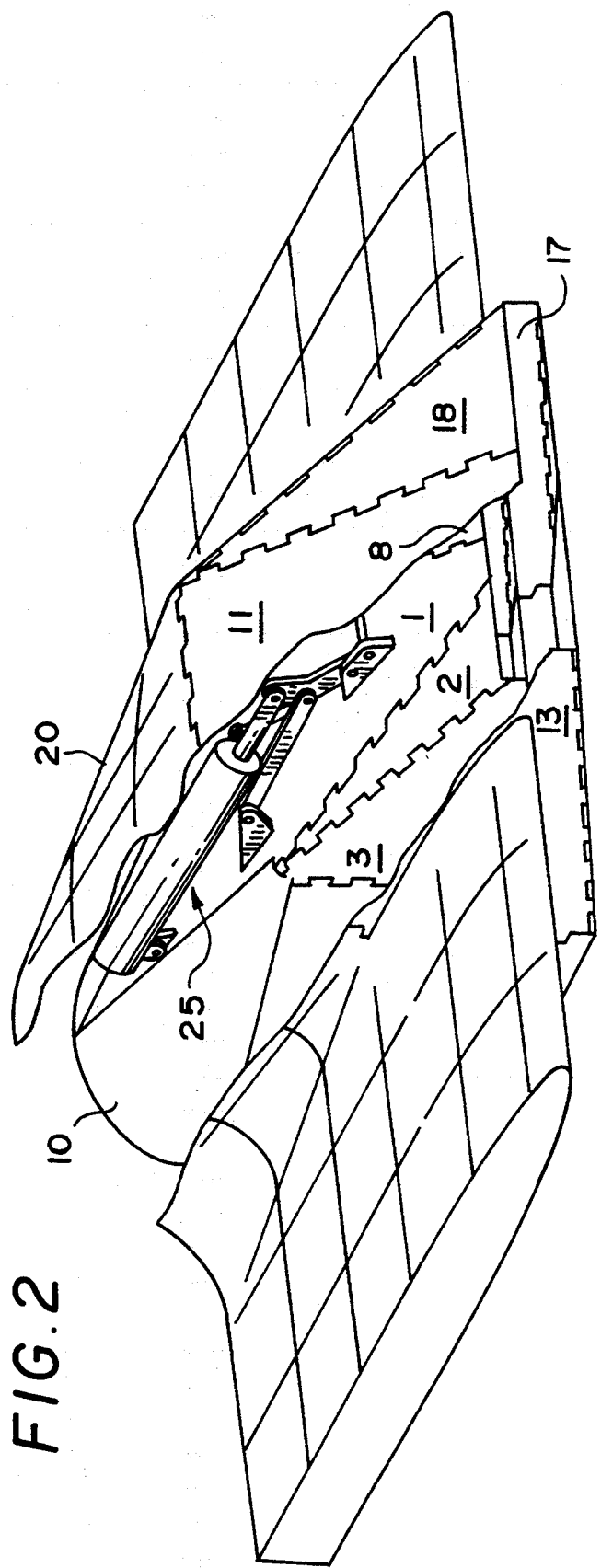
FIG. 2 is a perspective view, partially broken away, of the nozzle according to the present invention.

The completed nozzle is illustrated in FIG. 2, which is partially broken away to illustrate the control system. As can be seen, the nozzle is in a flattened configuration to provide an elongated, generally rectangular horizontal outlet which provides very low emissions of infrared radiation. The configurations of the set of inner, hot flaps and outer, cold flaps each have the structure illustrated in FIG. 1. The inner or hot flaps 1-8 are in direct contact with the hot gases emanating through the jet exhaust duct 10 to which they are attached and actuated by control means 25 located between the jet exhaust duct 10 and a surrounding aircraft structure 20, which a may be a fuselage. This structure ensures aerodynamic continuity of the aircraft.

FIG. 3 illustrates the connecting and actuating linkage for the inner and outer main flaps. The control means 25 comprises a control actuator 200 which is pivotally attached to the exhaust duct 10 via a pivot connection 210. The control actuator 200 has an extendible and retractable piston rod 220 which is connected to a control rod 240 having one end connected to a main inner flap 1 via pivoting connection 250. The control rod 240 is also connected to the exhaust duct 10 via attaching rod 260 and pivoting connections 270 and 280. The piston rod 220 is also connected to the control rod 240 by pivoting connection 230. Hinge connection 290 pivotally connects the main inner flap 1 to an end of the jet exhaust duct 10. Similarly, main outer flap 11 is pivotally connected to the surrounding aircraft structure 20 via pivoting connection 330. Control link 300 is connected to the main inner flap 1 and the main outer flap 11 by pivoting connections 310 and 320.

As can be seen in FIG. 3, extension of the piston rod 220 will cause the main flaps 1 and 11 to move toward the positions shown in dotted lines so as to vary the geometric configuration of the nozzle opening.

The flow of air over the surrounding aircraft structure 20 is illustrated at 30, while the flow of exhaust gases through the jet exhaust duct 10 is illustrated at 31. As is readily apparent, none of the flap attaching structure, or the control system extends into either one of these flows such that it does not induce disturbances in either one of the flows.

FIG. 4 is a perspective view of the nozzle illustrated in FIGS. 1-3 illustrating the nozzle in an aircraft cruising mode configuration in which the outlet opening forms a symmetrical convex polygonal cross section which approaches a circular configuration under normal flight at cruising speeds. Under these conditions, the exit end of the nozzle forms an octagon whose sides consist, for the inner nozzle (not illustrated in FIG. 4) of the small bases of the generally trapezoidal main flaps 1, 3, 5 and 7, as well as the bases of the secondary inner flaps 2, 4, 6 and 8. A similar configuration is formed by the small bases 11b, 13b, 15b and 17b of the generally trapezoidal main outer flaps 11, 13, 15 and 17, respectively. The large bases of the main outer flaps are pivotally attached to the surrounding aircraft structure 20. In this configuration, the nozzle closely approaches a circular cross-sectional configuration to provide axial thrust with good propulsion efficiency.

FIG. 5 is a view similar to FIG. 4, but illustrates the positions of the nozzle elements in a second operational configuration. In order to assume this configuration, the lateral inner and outer flaps 3, 7, 13 and 17, respectively are formed with a generally triangular configuration such that the "bases" 13b and 17b illustrated in FIG. 5 have a pointed configuration. This enables the inner and outer nozzles to be completely closed, thereby enabling the nozzle according to the invention to perform a thrust reversing function. The jet exhaust duct 10 and the aircraft structure 20 may, in known fashion, have thrust reversing discharge vanes 33 to impart a forward direction to the exhaust gases when the nozzle is closed as illustrated in FIG. 5. The discharge vanes 33 may, also in known fashion, be covered when the nozzle is in non-thrust reversing positions, or the vanes may move so as to be flush with the aircraft structure 20 when the nozzle is not in the thrust reversing position.

The hinges between the various adjacent flaps, as well as between the flaps and either the jet exhaust duct or the fuselage of the aircraft may be piano type hinges, as illustrated at 35 and 37 in FIGS. 4 and 5.

Under normal flight conditions, the main flaps of both the inner and outer nozzles are oriented symmetrically so as to form an approximately circular exhaust opening allowing axial thrust in a direction parallel to the longitudinal axis of the nozzle opening. Given the symmetry of the arrangement of the flaps, the nozzle according to the invention assumes a substantially circular opening configuration which is subjected to the internal pressures resulting from the forces of the discharge gases. The flaps which constitute the nozzle are mutually constrained which eliminates stresses being imparted to the actuating mechanisms, thereby enabling the actuators to be used only to deform the cross-section of the nozzle. The forces imposed upon the supporting structure are also reduced because the circular configuration offers greater resistance to mechanical and thermal deformation. Such a configuration also reduces the maneuvering forces necessary to position the flaps of the nozzles. The mass of the assembly is therefore reduced and the aerodynamic effect is improved in the absence of any fixed, stationary vertical walls as in the prior art devices. It is possible to reduce these forces by optimizing the relative surfaces of the horizontal flaps with respect to the lateral flaps whereby the power needed for deployment of the former is, at least in part, compensated by the aerodynamic forces on the latter.

Because the lengths of the flaps are much greater than the dimension of the exhaust discharge channel, it is possible to entirely close the nozzle and block the exhaust as illustrated in FIG. 5. This avoids the traditional solution of the prior art devices which consisted in closing the ports of the thrust reverser unit.

FIG. 6 illustrates a simplified control system for maneuvering the inner nozzle flaps. In the case of a single jet engine, as illustrated in FIGS. 1-5, the horizontal main inner flaps 1 and 5 are each controlled by a separate actuator. In the embodiment illustrated in FIG. 6, a single actuator is utilized to control the horizontal main flaps 1, 1', 5 and 5' which is possible if only partial closing of the nozzle is desired. FIG. 6 relates to an aircraft structure having dual jet engines and the inner nozzles are the same structure, but the nozzle of the second engine has its elements denoted by "'" superscript. The flap control is achieved by means of a single actuator 40 having an extendible and retractable control rod 45 to displace connection shafts 44 and 46 which are connected to main flaps 1 and 1', and main flaps 5 and 5', respectively. Intermediate guide rods 48 and 50 connect the control rod 45 to the connection shafts 44 and 46. This mechanism ensures simultaneous control of all of the flaps of both jet engines, thereby ensuring perfectly synchronous thrust. As in the previous embodiment, the main inner flaps 1, 1', 5 and 5' may be connected to corresponding main flaps of an outer nozzle such that the single actuator 40 will move both the inner and outer nozzle flaps. Because of its particular structure, the nozzle according to the present invention allows a considerable reduction in the number of actuators necessary to achieve simultaneous control of all of the flaps. In a single engine configuration, a minimum of two actuators are necessary, while in a dual engine configuration, a single actuator may be utilized. Under any desirable operating conditions, the present invention will not require more than four actuators, one actuator per main flap to be controlled.

Figure 7:
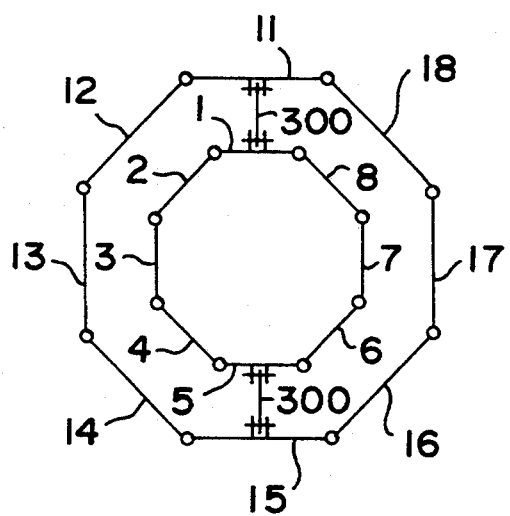
FIG. 7 is a schematic, rear view of the exhaust nozzle shown in FIGS. 1-4 illustrating the connections between the various flaps.

FIG. 7 is a schematic, rear view of a single engine aircraft illustrating the flaps of the nozzle according to the present invention and the interconnection of the nozzle flaps. The main inner flap 1 is connected to the main outer flap 11 via control link 300 and a similar control link 300 connects main inner flap 5 to main outer flap 15. In this particular configuration, the interconnected main flaps 1, 11, 5 and 15 are all generally horizontal. The actuator connection is as illustrated in FIG. 3 and, as can be seen, only two actuators, connected to main flaps 1 and 5, are required. The lateral main inner flaps 3 and 7, the main lateral outer flaps 13 and 17, as well as the secondary inner flaps 2, 4, 6 and 8, and the secondary outer flaps 12, 14, 16 and 18 all act as followers in regard to the positioning of the main flaps 1, 11, 5 and 15.

Figure 8:
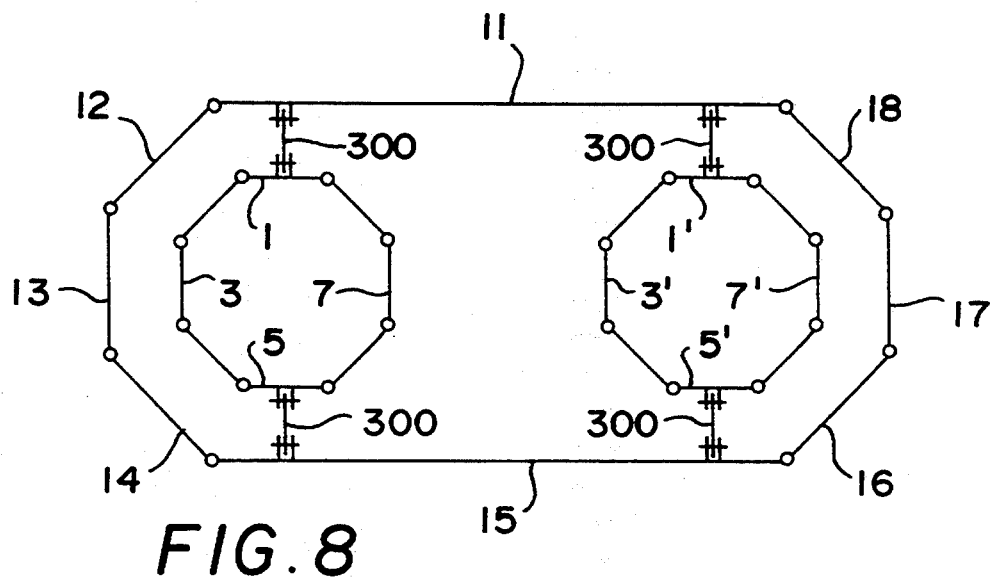
FIG. 8 is a view similar to FIG. 7, illustrating the dual-engine configuration shown in FIG. 6.

FIG. 8 is a view similar to FIG. 7, but illustrating a dual-engine configuration. Connecting links 300 connect main flaps 1 and 5 of one inner nozzle to main outer flaps 11 and 15 of the outer nozzle. The outer nozzle is also connected via links 300 to the main inner flap 1' and the main inner flap 5' of the second inner nozzle. Again, the interconnections are between the generally horizontally extending main flaps. In the dual engine configuration, the number of main outer flaps remains the same as in the single engine nozzle configuration. The actuator may be connected as in FIG. 6 in which case, the remaining flaps of both the inner and outer nozzles will assume only a following roll.

Figure 9:
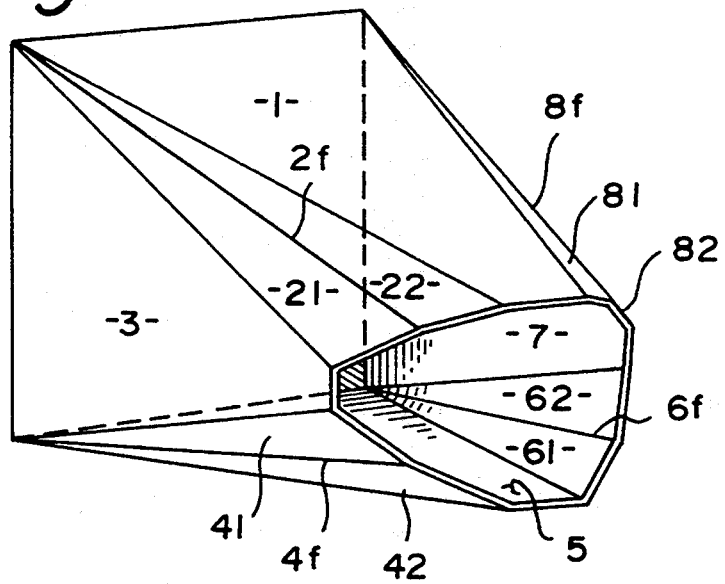
FIG. 9 is a perspective view of a second embodiment of an inner nozzle according to the present invention.

FIG. 9 is a perspective view of a second embodiment of a nozzle according to the present invention. This nozzle construction allows the vectoring of the thrust vertically or horizontally in addition to changing the configuration of the nozzle outlet. This nozzle structure includes twelve flaps consisting of four main flaps 1, 3, 5 and 7, as well as secondary flaps as in the previously described embodiment. However, each of the secondary flaps has a hinge line extending from an apex to a base such as at 2f, 4f, 6f and 8f in FIG. 9 so as to divide each of the secondary flaps into two portions 21 and 22; 41 and 42; 61 and 62; and 81 and 82. Each of the portions, as can be seen, are substantially triangular in configuration.

Figure 10:
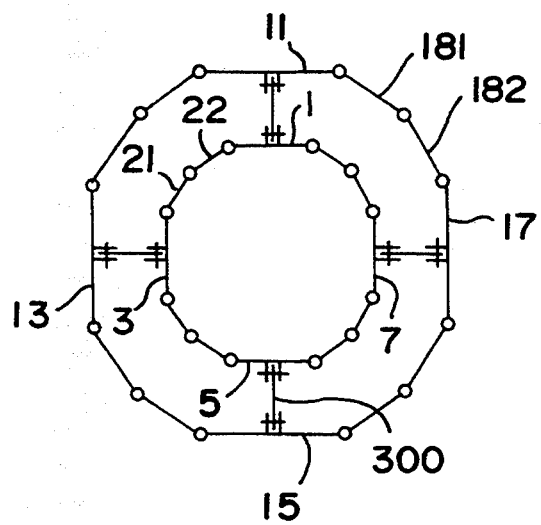
FIG. 10 is a schematic rear view of the nozzle illustrated in FIG. 9 showing the connections between the various flaps.
Figure 9A:
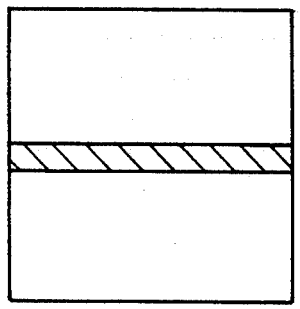
FIGS. 9A-9E schematically illustrate various cross-sectional configurations of the nozzle outlet for the nozzle illustrated in FIG. 9.
Figure 9B:
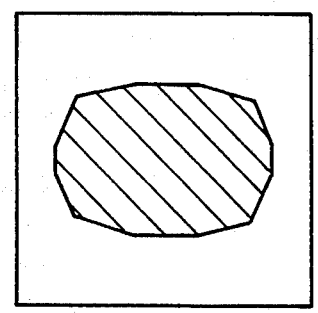
Figure 9C:
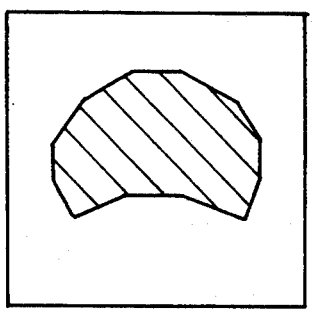
Figure 9D:
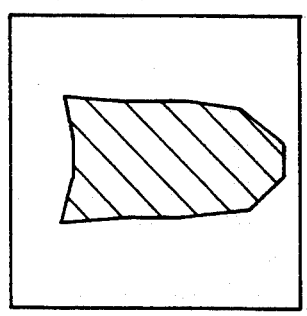
Figure 9E:
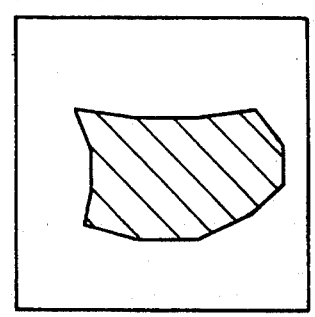

In this embodiment, the positions of each of the main flaps of the inner and outer nozzles is controlled by a separate actuator as schematically illustrated in FIG. 10. By selectively positioning each of the actuators, the nozzle outlet opening can be made to assume any of the configurations illustrated in FIGS. 9A–9E. FIG. 9A illustrates a configuration of the nozzle outlet to reduce the infrared signature of the aircraft. FIG. 9B illustrates a fully opened nozzle for axial thrust. FIGS. 9C and 9D schematically illustrate the nozzle opening for vectoring the thrust upward (9C) and toward the right (9D). FIG. 9E schematically illustrates the exhaust nozzle opening to vector the thrust to the right and down.

FIG. 10 is a schematic rear view of the nozzle illustrated in FIG. 9 illustrating the connections between the various inner and outer flaps. The control links 300 connect the main inner flap 1 and main outer flap 11; the main inner flap 3 and the main outer flap 13; the main inner flap 5 and the main outer flap 15; and the main inner flap 7 and the main outer flap 17. An actuator is connected to the system for each of the main inner flaps 1, 3, 5 and 7 in a fashion illustrated in FIG. 3. The remaining flaps all act as followers when the controlled flaps are moved.

Figure 11:
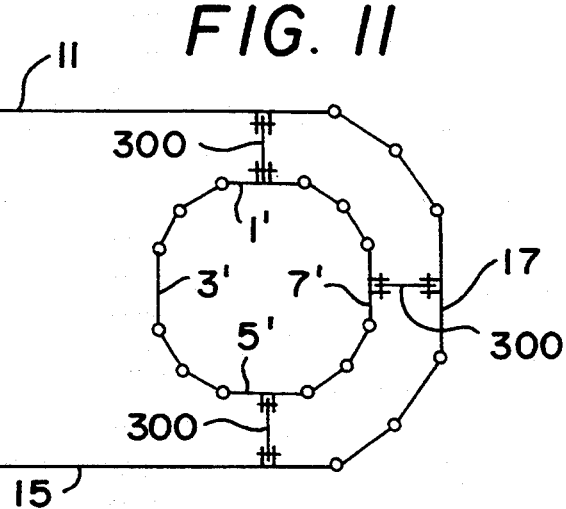
FIG. 11 is a schematic rear view, similar to FIG. 10, illustrating the second embodiment of the nozzle in a dual-engine configuration.

FIG. 11 schematically illustrates a rear view of the embodiment of FIG. 9 adapted to a dual-engine aircraft. In this configuration, the synchronization is achieved for each engine nozzle by interconnecting three of the inner main flaps to corresponding flaps of the outer nozzle. A control link 300 connects main outer flap 11 with main inner flaps 1 and 1', while main outer flap 15 is connected to main inner flaps 5 and 5'. Lateral main outer flaps 13 and 17 are connected to main lateral inner flaps 3 and 7', respectively. The upper and lower horizontal flaps may be controlled by a single actuator as illustrated in FIG. 6 while the main lateral flaps are controlled by the actuator of FIG. 3.

As can be seen, the nozzle according to the present invention allows an increased degree of maneuverability for an aircraft in which it is utilized while at the same time reducing the bulk and weight of the structure. In a first embodiment, the invention allows control of two opposite main flaps with the secondary flaps and the two other main flaps assuming the position of followers. If the lateral main flaps are formed in a triangular configuration, the nozzle may also completely block off the exhaust gas flow to perform a thrust reversing function. Finally, the invention may articulate the secondary flaps of each nozzle and provide actuators simultaneously acting on the four main flaps to cause not only variation of the geometry of the nozzle opening, but to also achieve a thrust vectoring function.

The foregoing description is provided for illustrative purposes only and should not be construed as in any way limiting this invention, the scope of which is defined solely by the appended claims.

I claim:

1. A variable cross-section nozzle for a jet powered aircraft having a jet exhaust duct and a surrounding aircraft structure, comprising:
    a) an inner adjustable nozzle comprising:
        i) first, second, third and fourth main inner flaps, each flap having a base pivotally attached to the jet exhaust duct such that the bases of the first and third flaps extend generally parallel to each other and the bases of the second and fourth flaps extend generally parallel to each other, the first and third flaps having a generally trapezoidal configuration with the larger bases attached to the jet exhaust duct; and,
        ii) first, second, third and fourth secondary inner flaps each having a generally triangular configuration with two sides pivotally attached to sides of two adjacent main inner flaps;
    b) an outer adjustable nozzle comprising:
        i) first, second, third and fourth main outer flaps, each flap having a base pivotally attached to the surrounding aircraft structure such that the bases of the first and third main outer flaps are generally parallel to each other and the bases of the second and fourth main outer flaps extend generally parallel to each other, the first and third main outer flaps having a generally trapezoidal configuration with the larger bases attached to the surrounding aircraft structure; and,
        ii) first, second, third and fourth secondary outer flaps each having a generally triangular configuration with two sides pivotally attached to sides of two adjacent main outer flaps; and,
    c) control means operatively connected to at least the first and third main inner flaps and the first and third main outer flaps to synchronously control the positions of the flaps to vary the geometry of the opening defined by the nozzle.

2. The variable cross-section nozzle of claim 1 wherein the second and fourth main inner flaps have generally trapezoidal configurations with the larger bases attached to the jet exhaust duct.

3. The variable cross-section nozzle of claim 2 wherein the second and fourth main outer flaps have generally trapezoidal configurations with the larger bases attached to the surrounding aircraft structure.

4. The variable cross-section nozzle of claim 1 wherein the second and fourth main inner flaps have generally triangular configurations with the bases attached to the jet exhaust duct.

5. The variable cross-section nozzle of claim 4 wherein the second and fourth main outer flaps have generally triangular configurations with the bases attached to the surrounding aircraft structure.

6. The variable cross-section nozzle of claim 1 wherein the control means comprises:
    a) a first control link attached to the first main inner flap and the first main outer flap;
    b) a second control link attached to the third main inner flap and the third main outer flap;
    c) a first inner flap control assembly pivotally connected to the first main inner flap and to the jet exhaust duct;
    d) a second inner flap control assembly pivotally connected to the third main inner flap and to the jet exhaust duct;
    e) a first actuator connected to the first inner flap control assembly; and,
    f) a second actuator connected to the second inner flap control assembly.

7. The variable cross-section nozzle of claim 6 wherein the first and second actuator each comprises a control cylinder having an extendible and retractable piston rod connected to a respective flap control assembly.

8. The variable cross-section nozzle of claim 7 wherein the first main inner flap control assembly comprises:
   a) a first control rod connected to the piston rod and to the first main inner flap; and,
   b) a first attaching rod connected to the first control rod and to the jet exhaust duct.

9. The variable cross-section nozzle of claim 8 wherein the second main inner flap control assembly comprises:
   a) a second control rod connected to the piston rod and to the third main inner flap; and,
   b) a second attaching rod connected to the second control rod and to the jet exhaust duct.

10. The variable cross-section nozzle of claim 1 wherein each secondary inner flap further comprises hinge means extending from an apex to a base of the generally triangular configuration so as to divide each secondary inner flap into two portions, each portion having a generally triangular configuration.

11. The variable cross-section nozzle of claim 10 wherein each secondary outer flap further comprises hinge means extending from an apex to a base of the generally triangular configuration so as to divide each secondary outer flap into two portions, each portion having a generally triangular configuration.

12. The variable cross-section nozzle of claim 11 wherein the control means is operatively connected to the first, second, third and fourth main inner flaps and to the first, second, third and fourth main outer flaps.

13. The variable cross-section nozzle of claim 12 wherein the control means comprises a plurality of control cylinders and a plurality of connecting linkages, each linkage connecting a control cylinder to one main inner and one main outer flap.

14. The variable cross-section nozzle of claim 13 wherein each control cylinder has an extendible and retractable piston rod and each connecting linkage comprises:
   a) a control link attached to a main inner flap and a main outer flap;
   b) a control rod connected to the piston rod and to a main inner flap; and,
   c) an attaching rod connected to the control rod and to the jet exhaust duct.

15. A variable cross-section nozzle for a jet powered aircraft having two jet exhaust ducts and a surrounding aircraft structure comprising:
   a) an inner adjustable nozzle for each jet exhaust duct, each inner adjustable nozzle comprising:
      i) first, second, third and fourth main inner flaps, each flap having a base pivotally attached to the jet exhaust duct such that the base of the first and third flaps extend generally parallel to each other and the bases of the second and fourth flaps extend generally parallel to each other, the first and third flaps having a generally trapezoidal configuration with the larger bases attached to the jet exhaust duct; and,
      ii) first, second, third and fourth secondary inner flaps each having a generally triangular configuration with two sides pivotally attached to sides of two adjacent main inner flaps;
   b) an outer adjustable nozzle comprising:
      i) first, second, third and fourth main outer flaps, each flap having a base pivotally attached to the surrounding aircraft structure such that the bases of the first and third main outer flaps are generally parallel to each other and the bases of the second and fourth main outer flaps extend generally parallel to each other, the first and third main outer flaps having a generally trapezoidal configuration with the larger bases attached to the surrounding aircraft structure; and,
      ii) first, second, third and fourth secondary outer flaps each having a generally triangular configuration with two sides pivotally attached to sides of two adjacent main outer flaps; and,
   c) control means operatively connected to at least the first and third main flaps of each inner nozzle and to the first and third main outer flaps to synchronously control the positions of the flaps so as to vary the geometry of the openings defined by the nozzles.

16. The variable cross-section nozzle of claim 15 wherein the control means comprises:
   a) at least one cylinder; and,
   b) connecting linkage interconnecting the at least one control cylinder with at least one main outer flap and at least one main inner flap on each inner nozzle.

17. The variable cross-section nozzle of claim 16 wherein the at least one control cylinder has an extendible and retractable piston rod and wherein the connecting linkage comprises:
   a) a control link attached to a main inner flap of each inner nozzle and a main outer flap;
   b) at least one connection shaft connecting the main inner flaps of each inner nozzle; and,
   c) a guide rod connected to the connection shaft and to the piston rod.

18. The variable cross-section nozzle of claim 15 wherein each secondary inner flap further comprises hinge means extending from an apex to a base of the generally triangular configuration so as to divide each secondary inner flap into two portions, each portion having a generally triangular configuration.

19. The variable cross-section nozzle of claim 18 wherein each secondary outer flap further comprises hinge means extending from an apex to a base of the generally triangular configuration so as to divide each secondary outer flap into two portions, each portion having a generally triangular configuration.

20. The variable cross-section nozzle of claim 19 wherein the control means operatively connects the first main outer flap to the first main inner flaps of both inner nozzles, and the third main outer flap to the third main inner flaps of both inner nozzles.

21. The variable cross-section nozzle of claim 20 wherein the control means connects the second main outer flap to the second main inner flap of one nozzle and the fourth main outer flap to the fourth main inner flap of the other nozzle.

* * * * *